Aug. 25, 1953  D. L. RUNNELLS, JR., ET AL  2,649,881
MACHINE FOR SKINNING HOGSIDES
Filed Dec. 4, 1950  3 Sheets-Sheet 1
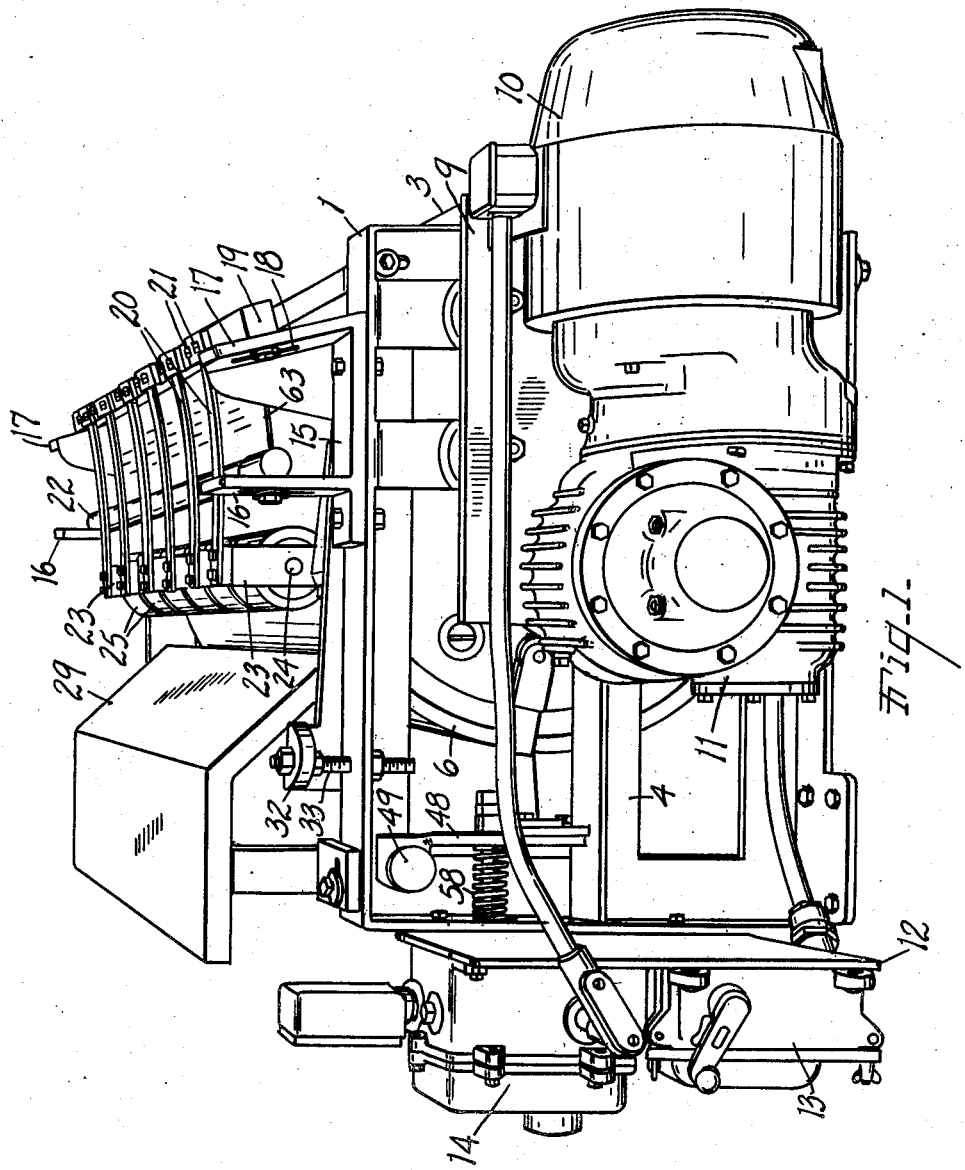
INVENTOR.
David L. Runnels, Jr.
Paul F. Burch
BY 
ATTORNEY

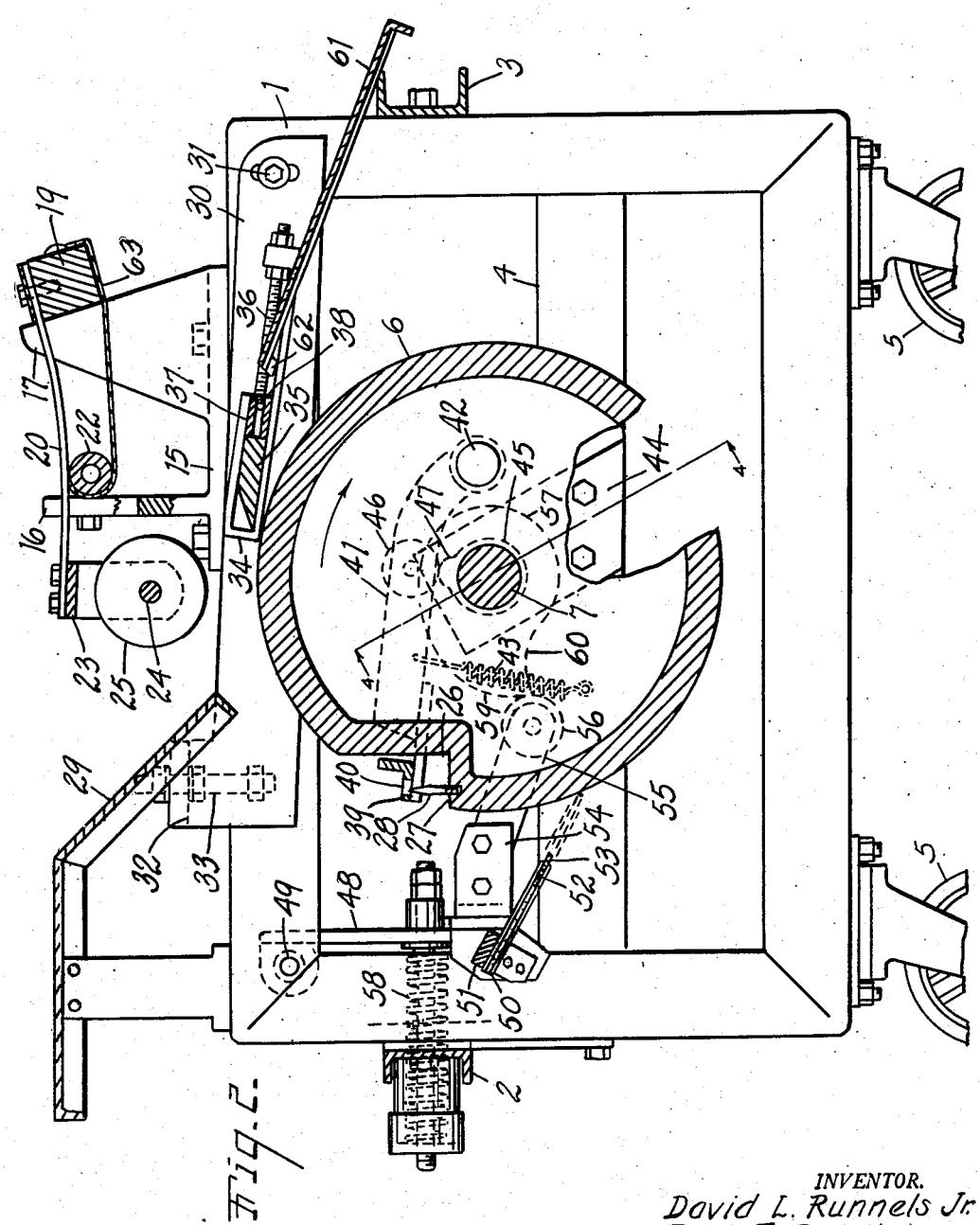

Aug. 25, 1953  D. L. RUNNELLS, JR., ET AL  2,649,881
MACHINE FOR SKINNING HOGSIDES

Filed Dec. 4, 1950  3 Sheets-Sheet 3

INVENTOR.
David L. Runnels Jr.
Paul F. Burch
BY
ATTORNEY.

Patented Aug. 25, 1953

2,649,881

UNITED STATES PATENT OFFICE 2,649,881

MACHINE FOR SKINNING HOGSIDES

David L. Runnells, Jr., and Paul F. Burch, Rockford, Mich., assignors to Wolverine Shoe & Tanning Corporation, Rockford, Mich.

Application December 4, 1950, Serial No. 199,052

10 Claims. (Cl. 146—130)

This invention relates to improvements in a machine for skinning hogsides.

The principal objects of this invention are:

First, to provide an improved and simplified machine for removing the skins from hogsides after the edible meat cuts have been removed therefrom.

Second, to provide a hogside skinning machine which is operative to skin hogsides of different thicknesses without adjustment of the machine.

Third, to provide a hogside skinning machine with a novel and effective arrangement of pins and stripper for effectively gripping the hogsides and thereafter stripping the defatted skin from the pins.

Fourth, to provide a novel form of wiper for separating the defatted skins from the skinning drum of a skinning machine.

Fifth, to provide a hogside skinning machine which is co-operable with the cutting tables and conveyors of a meat packing establishment to automatically receive and skin hogsides as they are advanced from the meat cutting operations.

Sixth, to provide a novel form of pressure roll support for a hogside skinning machine which will provide the proper pressure on the pressure rolls throughout a wide range of positions whereby the pressure rolls are operable without adjusting on hogsides which vary considerably in thickness.

Other objects and advantages relating to details of our machine will be apparent from a consideration of the following description and claims.

The drawings, of which there are three sheets, illustrate a preferred form of the machine.

Fig. 1 is a perspective view of the front side and top of the machine.

Fig. 2 is a vertical longitudinal cross sectional view through the machine.

Figure 3:
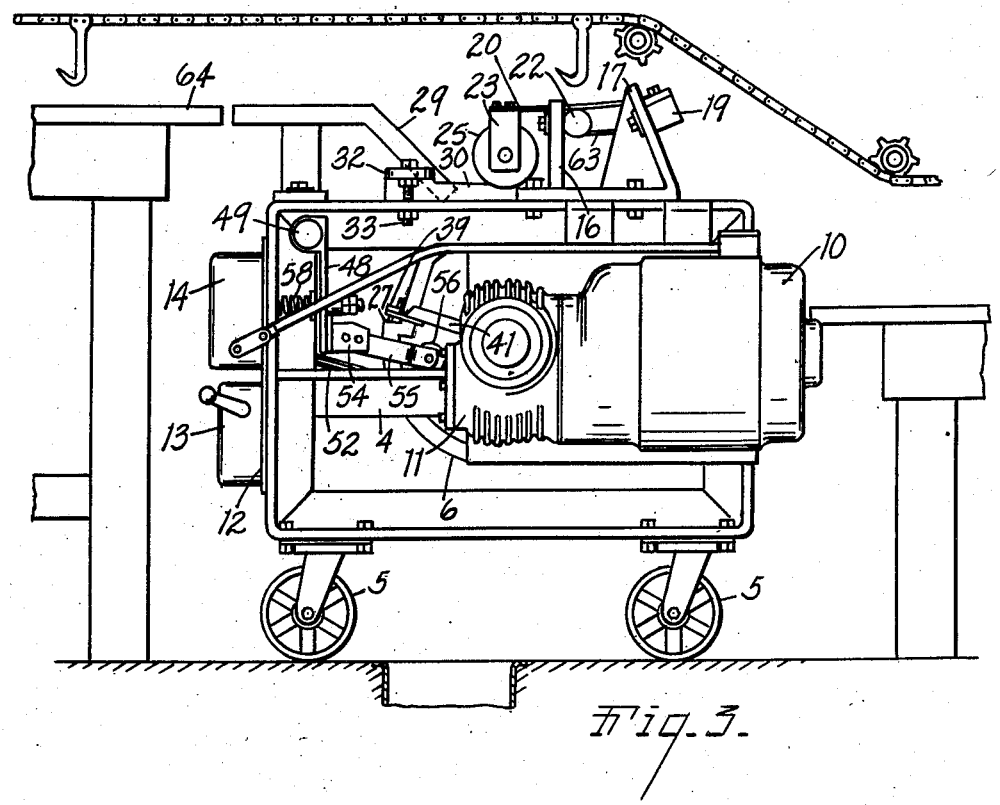
Fig. 3 is a front side elevational view of the machine operatively associated with the cutting tables and conveyor of a meat packing plant.

For the purposes of description, the machine may be considered as extending longitudinally from left to right as shown in Figs. 1 to 3 corresponding to the direction of movement of the hogsides therethrough. The machine includes a suitable framework for supporting the several elements thereof and in the example illustrated, this framework includes the generally rectangular side frames 1 connected by a rear cross member 2 and front cross member 3. The side frames 1 are provided with horizontal bearing support beams 4 extending longitudinally intermediate of the height of the side frames. Desirably caster wheels or rollers 5 are mounted on the bottom of the framework so that the machine may be moved from place to place in a packing plant when necessary.

Extending transversely within the framework of the machine is an elongated skinning drum 6 of relatively heavy rigid construction to withstand the pressure of the packing rolls without deflection. The skinning drum 6 is mounted upon and rotatable with a transverse shaft 7 and the shaft is rotatably mounted in bearing brackets 8 secured to the bearing support bars 4 at each end of the framework.

The front side frame 1 of the machine carries a mounting plate 9 on which a power unit for rotating the drum is mounted. The power unit includes an electric motor 10 of suitable power connected through a speed reducer 11 to the shaft 7. A control panel 12 secured to the side frame at the front edge thereof serves to support the necessary power supply switch box 13 and control switch box 14 for operating the motor 10.

Secured to the tops of the side frames 1 are a pair of upwardly opening U-shaped brackets 15 having rear vertical uprights 16 and front uprights 17 inclined rearwardly of the machine. The inclined uprights 17 are slotted as at 18 (see Fig. 1) to receive bolts for adjustably clamping the spring support beam 19 along the front of the machine. The spring support beam 19 carries a plurality of rearwardly extending leaf springs 20 with the forward ends of the springs rigidly clamped to the support beam by screws 21. The springs 20 extend rearwardly across the top of a spring adjusting bar 22 which is vertically adjustably supported by the rear uprights 16. Rearwardly of the spring adjusting bar 22, each of the leaf springs 20 is provided with a transversely extending downwardly opening U-shaped yoke 23 with a roller shaft 24 extending between the lower ends thereof. The shafts 24 rotatably support the pressure rollers 25 in adjustable opposed relationship to the top of the drum 6. Note that by vertical adjustment of the support bar 19 and loading bar 22, both the initial spacing of the pressure rollers and their pre-load tension may be adjusted to the desired figures. The elongated character of the leaf springs 20 permits a relatively wide range of movement of the rollers 25 relative to the drum 6 without excessively changing the pressure which the rollers exert toward the drum.

In order to secure hogsides to the drum 6 to pull them underneath the pressure rollers 25, the drum is longitudinally notched as at 26 in Fig. 2 to provide a radially extending surface 27 facing in the direction of rotation of the drum. Fixedly projecting from the surface 27 and spaced longitudinally therealong are a series of piercing pins, one of which is illustrated at 28. Hogsides which have had all of the bones and most of the edible meat cut therefrom are fed sideways to the drum over an inclined feed chute 29 supported over the rear end of the framework. It will be noted that the feed chute 29 is inclined slightly rearwardly from the radius of the drum extending to the front edge of the feed chute. The feed chute further terminates in substantial radially spaced relationship to the drum. Thus as the leading edge of a hogside is projected over the edge of the feed chute, it will bend and fall slightly into a radial plane of the drum 6 and will fall by gravity into the notch 26 in generally parallel reationship to the radial surface 27. In this position, the piercing pins 28 will be carried perpendicularly into the hogside. It should be understood that the hogsides are advanced over the feed chute 29 in a "skin down" position so that the pins 28 will first pierce the skin side. Continued rotation of the drum will then carry the side forwardly around the drum with the skin lapped upon the drum and with the fat surface of the side being drawn under the pressure rollers 25.

Mounted along the inner sides of the side frames 1 and extending longitudinally along the tops thereof are a pair of knife support beams 30. The beams 30 have an adjustable bolt and slot connection 31 at their forward end to the side frames and are provided with laterally outturned ears 32 at their rear ends which overlie the tops of the side frames 1. Vertically adjusting screws 33 extend through the ears 32 and tops of the side frames for tiltably adjusting the knife support beams 30. Intermediate of their ends the knife support beams 30 are provided with laterally inwardly projecting knife receiving guide flanges 34 which receive and guide an elongated knife blade 35 which thus extends transversely of the machine and longitudinally along the top of the drum 6. The rear ends of the flanges 34 are arranged in forwardly opening U-shaped fashion so that the ends of the blade can be slipped therein with a sliding motion rearwardly of the machine. Clamping screws 36 threaded through forward ends of the guide flanges 34 clamp the blade in its adjusted position. With particular reference to Fig. 2, it will be noted that the blade 35 is provided with a separable rear backing bar 37 which is longitudinally slotted to receive an elongated heating element or elements 38 for heating the knife blade.

In order to release each skin successively from the drum after it has been separated from the fatty portion of the hogside, the drum is provided with an angle-shaped stripper bar 39 which seats against and extends along the radial surface 27 of the drum. The stripper bar is apertured as at 40 to pass the pins 28 and is connected at its ends to the lever arms 41. The arms 41 are mounted one at each end of the drum and are pivotally connected to the end walls of the drum by the pivot pins 42. The arms 41 rotate with the drum 6 and are constantly urged to move the stripper bar 39 toward the surface 27 by coil springs 43.

Figure 4:
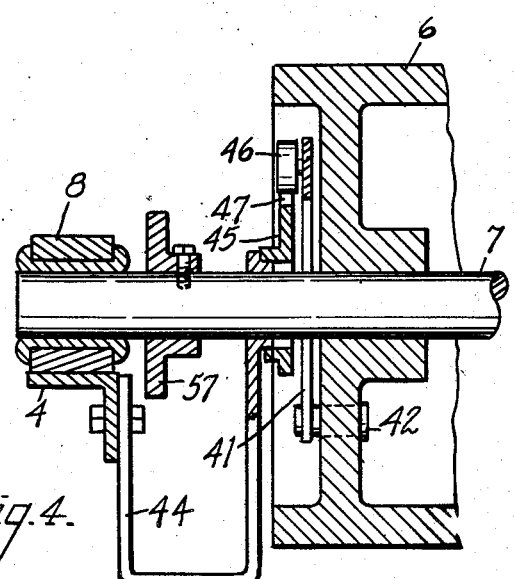
Fig. 4 is a fragmentary transverse cross sectional view taken along the plane of the line 4—4 of Fig. 2.

Fixedly secured to the bearing support bars 4 are inwardly extending U-shaped brackets 44 (see Fig. 4). The inner arms of the brackets 44 embrace the shaft 7 and fixedly support cams 45. The cams 45 are disposed in the path of travel of rollers 46 mounted on the arms 41 and the cams 45 are provided with raised lifts 47 which coact with the rollers 46 to raise the arms and the stripper bar 39 as the drum reaches the position shown in Fig. 2. The leading edge of the newly skinned hog skin is thus effectively stripped from the pins 28.

Since the hog skins will be in a relatively moist and adhered condition after having been tightly pressed against the drum 6, we have provided a separator for insuring removal of the skins from the drum after they have been stripped from the pins 28. This separator structure includes a pair of arms 48 pivotally secured to the side frames at the rear upper corners thereof as indicated at 49. The arms 48 extend downwardly and carry brackets 50 at their lower ends for supporting the transversely extending bar 51. Intermediate of the length of the bar 51, there is provided a forwardly projecting separator plate 52 desirably having a fibrous or non-metallic leading edge 53. The lower ends of the arms 48 are also provided with forwardly extending brackets 54 to which struts 55 are secured. The struts 55 carry rollers 56 at their front ends and the rollers are engageable with and travel along cams 57 secured to the shaft 7 at each end of the drum. Backing springs 58 extending through the rear ends of the side frames constantly urge the arms 48 and separator plate 52 forwardly toward the surface of the drum. The cams 57 are provided with gradually increased or radially extended lift surfaces 59 which return abruptly to a constant radius as at 60 (see Fig. 2).

The lifts 47 and 59 of the cams 45 and 57 respectively, are relatively angularly disposed with respect to the rotation of the drum 6 so that the separator plate 53 will be retracted from the drum substantially before the notch 26 and pins 28 reach the separator. The separator plate will remain retracted until the stripper bar 39 has released the skin from the pins 28, after which the separator plate will almost immediately move rearwardly to engage the surface of the skin with considerable pressure against the drum. The separator plate is relatively narrow, being only seven or eight inches wide, and its pressure against the skin in an inclined direction causes the skin to wrinkle along the surface of the drum. The wrinkling of the skin breaks the vacuum underneath the skin and coupled with the retarding action of the separator plate, this is sufficient to permit the newly separated skin to fall away from the drum. At the next succeeding retraction of the separator plate, the leading edge of the skin which has draped itself over the separator plate will fall by gravity between the separator plate and the drum prior to a succeeding skin being advanced to the separator plate.

In order that the machine may be kept clean and that the separated fatty portions of the hogsides may be delivered for further processing, we have provided a discharge chute 61 which rests upon the front cross member 3 and is provided with lugs 62 at its rear end removably engaging the knife supporting flange 34. A guard plate 63 has a rolled rear edge snapped around the spring loading bar 22 and a flanged front edge having a snap engagement with the spring support bar 19. The fatty portions of the hogsides are of course carried over the top of the blade 35 where they are advanced by succeeding fat portions along the delivery chute 61 to a suitable delivery table or off-feed conveyor.

The spacing of the blade 35 from the surface of the drum 6 can be adjusted to determine the thickness of the hog skin obtained and the yieldable support for the backing rolls 25 assures that the hogsides will be tightly pressed to the drum as they are advanced to the blade by reason of engagement of the leading edges of the sides with the pins 28. Desirably, the drum 6 is of relatively small diameter in the order of sixteen inches in diameter so that the height of the machine and the feed chute 29 will be about the same as the height of a meat cutting table as indicated at 64 in Fig. 3. The drum desirably rotates between eight and ten revolutions per minute. Thus the meat cutter who removes the last cut of bone or meat from the hogside has merely to advance the hogside with a sliding motion to the feed chute 29 after which the machine operates automatically to skin the hogside.

Having thus described our invention, what we claim as new and desire to secure by Letters Patent, is:

1. A machine for skinning hogsides comprising, a supporting frame, a drum extending transversely of said frame and having a notch extending longitudinally in its periphery with a radial surface facing the direction of rotation of the drum, power means for rotating said drum, pins projecting normally from said radial surface and into said notch, a feed chute having an inclined portion terminating at its lower edge in spaced relationship with said drum and directed at a slightly rearward angle from a radius of said drum to said lower edge, pressure rolls positioned over said drum forwardly of said chute, individual leaf springs yieldably and adjustably supporting said pressure rolls and extending longitudinally therefrom, a skinning knife having a heating element associated therewith and extending longitudinally of said drum and adjustable radially with respect thereto, a stripper bar disposed along said radial surface of said drum and having holes passing said pins, arms pivotally connecting the ends of said stripper bar to the ends of said drum, cams fixedly carried by said frame and adjacent to said arms, cam rollers on said arms cooperative with said cams to move said stripper bar tangentially of said drum and over said pins, a separator plate swingably supported on said frame to the rear of said drum and spring urged toward the mid-portion of said drum, other cams rotatable with said drum at the ends thereof, and cam followers movable with said separator plate and engageable with said other cams to retract said separator plate as the notch in said drum travels thereacross, said fixed and rotatable cams being angularly disposed to move said stripper bar to strip skins from said pins while said separator bar is retracted from said drum.

2. A machine for skinning hogsides comprising, a supporting frame, a drum extending transversely of said frame and having a notch extending longitudinally in its periphery with a radial surface facing the direction of rotation of the drum, power means for rotating said drum, pins projecting normally from said radial surface and into such notch, a feed chute having an inclined portion terminating at its lower edge in spaced relationship with said drum and directed at a slightly rearward angle from a radius of said drum to said lower edge, pressure rolls positioned over said drum forwardly of said chute, individual leaf springs yieldably and adjustably supporting said pressure rolls and extending longitudinally forwardly therefrom, a skinning knife extending longitudinally of said drum and adjustable radially with respect thereto, a stripper bar disposed along said radial surface of said drum and having holes passing said pins, arms pivotally connecting the ends of said stripper bar to the ends of said drum, cams fixedly carried by said frame and adjacent to said arms, cam rollers on said arms cooperative with said cams to move said stripper bar tangentially of said drum and over said pins, a separator plate swingably supported on said frame to the rear of said drum and spring urged toward the mid-portion of said drum, other cams rotatable with said drum at the ends thereof, and cam followers movable with said separator plate and engageable with said other cams to retract said separator plate as the notch in said drum travels thereacross.

3. A machine for skinning hogsides comprising, a supporting frame, a drum extending transversely of said frame and having a notch extending longitudinally in its periphery with a radial surface facing the direction of rotation of the drum, power means for rotating said drum, pins projecting normally from said radial surface and into said notch, a feed chute having an inclined portion directed forwardly to said drum and terminating at its lower edge in spaced relationship with said drum, pressure rolls positioned over said drum, individual leaf springs yieldably and adjustably supporting said pressure rolls, a skinning knife having a heating element associated therewith and extending longitudinally of said drum and adjustable radially with respect thereto, a stripper bar disposed along said radial surface of said notch in said drum and having holes passing said pins, arms swingably connecting the ends of said stripper bar to said drum, a cam fixedly carried by said frame and adjacent to one of said arms, said cam having a lift cooperative with said one arm to move said stripper bar tangentially of said drum and over said pins, a separator plate swingably supported on said frame and spring urged toward said drum, another cam rotatable with said drum, and a cam follower movable with said separator plate and engageable with said other cam to retract said separator plate as the notch in said drum travels thereacross.

4. A machine for skinning hogsides comprising, a supporting frame, a drum extending transversely of said frame and having a notch extending longitudinally in its periphery with a surface facing the direction of rotation of the drum, power means for rotating said drum, pins projecting from said surface and into said notch, a feed chute having an inclined portion directed forwardly to said drum and terminating at its lower edge in spaced relationship with said drum, pressure rolls positioned over said drum, individual leaf springs yieldably and adjustably supporting said pressure rolls, a skinning knife extending longitudinally of said drum and adjustable radially with respect thereto, a stripper bar disposed along said surface of said notch in said drum and having holes passing said pins, arms swingably connecting the ends of said stripper bar to said drum, and a cam fixedly carried by said frame and adjacent to one of said arms, said cam having a lift cooperative with said one arm to move said stripper bar tangentially of said drum and over said pins.

5. A machine for skinning hogsides comprising, a supporting frame, a drum extending transversely of said frame and having a generally radial surface facing the direction of rotation of the drum with a cylindrical skin supporting surface extending behind said radial surface, power means for rotating said drum, pins projecting forwardly from said radial surface, a feed chute arranged to slidably direct hogsides in an edgewise position to the periphery of said drum and to said pins, a pressure roll positioned over said drum ahead of said chute, a leaf spring yieldably and adjustably supporting said pressure roll, a skinning knife having a heating element associated therewith and extending longitudinally of said drum and adjustable radially with respect thereto, a stripper bar disposed along said radial surface of said drum and alongside said pins, an arm movably connecting said stripper bar to said drum for rotation therewith and movement relative thereto, and means fixedly carried by said frame and cooperative with said arm to move said stripper bar tangentially of said drum and over said pins at a predetermined position in the rotational cycle of said drum.

6. In a machine for skinning hogsides and having a rotatable drum for translating said sides against a knife, the combination of, a plurality of pressure rolls disposed in spaced relationship with said drum and ahead of said knife with respect to the rotation of said drum, a support bar vertically adjustably secured to said machine and extending parallel to said drum and above said knife, a plurality of leaf springs each having one end secured to said bar and projecting rearwardly transversely of said drum, brackets connecting the free ends of said springs to said pressure rollers, and an adjusting bar vertically adjustably supported on said machine and extending longitudinally of said drum between said drum and said springs to adjustably support and tension said springs intermediately of their length.

7. In a machine for skinning hogsides and having a rotatable drum for translating said sides against a knife, the combination of, a plurality of pressure rolls disposed in space relationship with said drum and ahead of said knife with respect to the rotation of said drum, a support bar secured to said machine and extending parallel to said drum and above said knife, a plurality of leaf springs each having one end secured to said bar and projecting rearwardly transversely of said drum, brackets connecting the free ends of said springs to said pressure rollers, and an adjusting bar vertically adjustably supported on said machine and extending longitudinally of said drum between said drum and said springs to adjustably support and tension said springs intermediately of their length.

8. In a machine for skinning hogsides and having a rotatable drum for translating said sides against a knife, the combination of, a pressure roll disposed in spaced relationship with said drum and ahead of said knife, a first support vertically adjustably secured to said machine, a leaf spring having one end secured to said support and projecting transversely of said drum, a bracket connecting the free end of said spring to said pressure roller, and a second support vertically adjustably supported on said machine between said drum and said springs to adjustably support and tension said spring intermediately of its length.

9. In a machine for skinning hogsides and having a rotatable drum for translating said sides against a knife, the combination of, a pressure roll disposed in spaced relationship with said drum and ahead of said knife, a first support secured to said machine, a leaf spring having one end secured to said support and projecting transversely of said drum, a bracket connecting the free end of said spring to said pressure roller, and a second support vertically adjustably supported on said machine between said drum and said spring to adjustably support and tension said spring intermediately of its length.

10. In a machine for skinning hogsides and having a rotatable drum for translating said sides against a knife, the combination of, a pressure roll disposed in spaced relationship with said drum and ahead of said knife, a first support vertically adjustably secured to said machine, a leaf spring having one end secured to said support and projecting transversely of said drum, a bracket connecting the free end of said spring to said pressure roller, and a second support supported on said machine between said drum and said spring to support and tension said spring intermediately of its length.

DAVID L. RUNNELLS, Jr.
PAUL F. BURCH.

References Cited in the file of this patent

UNITED STATES PATENTS

| Number | Name | Date |
|--------|------|------|
| 638,238 | Haley et al. | Dec. 5, 1899 |
| 657,322 | Taliaferro | Sept. 4, 1900 |
| 782,992 | Schmidt et al. | Feb. 21, 1905 |
| 1,516,678 | Morrison | Nov. 25, 1924 |
| 1,759,478 | Bergstrom | May 20, 1930 |
| 1,790,592 | Morrison | Jan. 27, 1931 |
| 2,155,730 | Miller | Apr. 25, 1939 |
| 2,292,319 | Dziedzic et al. | Aug. 4, 1942 |
| 2,539,692 | Hickman et al. | Jan. 30, 1951 |